United States Patent
Miyazaki et al.

(10) Patent No.: US 10,969,238 B2
(45) Date of Patent: Apr. 6, 2021

(54) ROUTE SEARCHING METHOD AND ROUTE SEARCHING DEVICE

(71) Applicant: Nissan Motor Co., Ltd., Kanagawa (JP)

(72) Inventors: Yasuhito Miyazaki, Kanagawa (JP); Hiroya Fujimoto, Kanagawa (JP); Yasuo Yoshikawa, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 47 days.

(21) Appl. No.: 16/326,346

(22) PCT Filed: Aug. 16, 2016

(86) PCT No.: PCT/JP2016/073890
§ 371 (c)(1),
(2) Date: Feb. 18, 2019

(87) PCT Pub. No.: WO2018/033957
PCT Pub. Date: Feb. 22, 2018

(65) Prior Publication Data
US 2019/0226864 A1    Jul. 25, 2019

(51) Int. Cl.
*G01C 21/00* (2006.01)
*G01C 21/36* (2006.01)
*G01C 21/34* (2006.01)
*B60W 40/09* (2012.01)

(52) U.S. Cl.
CPC ......... *G01C 21/3641* (2013.01); *B60W 40/09* (2013.01); *G01C 21/3484* (2013.01)

(58) Field of Classification Search
CPC .......... G01C 21/3641; G01C 21/3484; B60W 40/09
See application file for complete search history.

(56) References Cited

U.S. PATENT DOCUMENTS

| | | | |
|---|---|---|---|
| 2008/0319645 A1 | 12/2008 | Kumagai et al. | |
| 2014/0278086 A1* | 9/2014 | San Filippo | ....... G01C 21/3492 701/527 |
| 2015/0100237 A1 | 4/2015 | Zhao et al. | |
| 2019/0011918 A1* | 1/2019 | Son | ..................... G01C 21/3691 |

FOREIGN PATENT DOCUMENTS

| | | |
|---|---|---|
| JP | H05-224601 A | 9/1993 |
| JP | 2005-337833 A | 12/2005 |
| JP | 2006-177804 A | 7/2006 |
| JP | 2008-157891 A | 7/2008 |
| JP | 2009-002817 A | 1/2009 |
| JP | 2009-300249 A | 12/2009 |
| JP | 2010-038821 A | 2/2010 |
| JP | 2014-081239 A | 5/2014 |

* cited by examiner

*Primary Examiner* — Adam M Alharbi
(74) *Attorney, Agent, or Firm* — Osha Bergman Watanabe & Burton LLP

(57) ABSTRACT

A route searching method using a route searching device for searching for a first route to reach a destination includes accumulating a history of activities of a driver in a database, when the history of activities is accumulated, setting a region based on a position on a map at which the history of activities is accumulated as a first region, increasing an area of the first region as the history of activities increases, and searching for a secondary route for reaching the destination from the first region using the route searching device.

13 Claims, 18 Drawing Sheets

| RECOMMENDED ORDER | REQUIRED TIME ESTIMATED VALUE |
|---|---|
| 1 | 51  41 MINUTES |
| 2 | 49  40 MINUTES |
| 3 | 50  45 MINUTES |

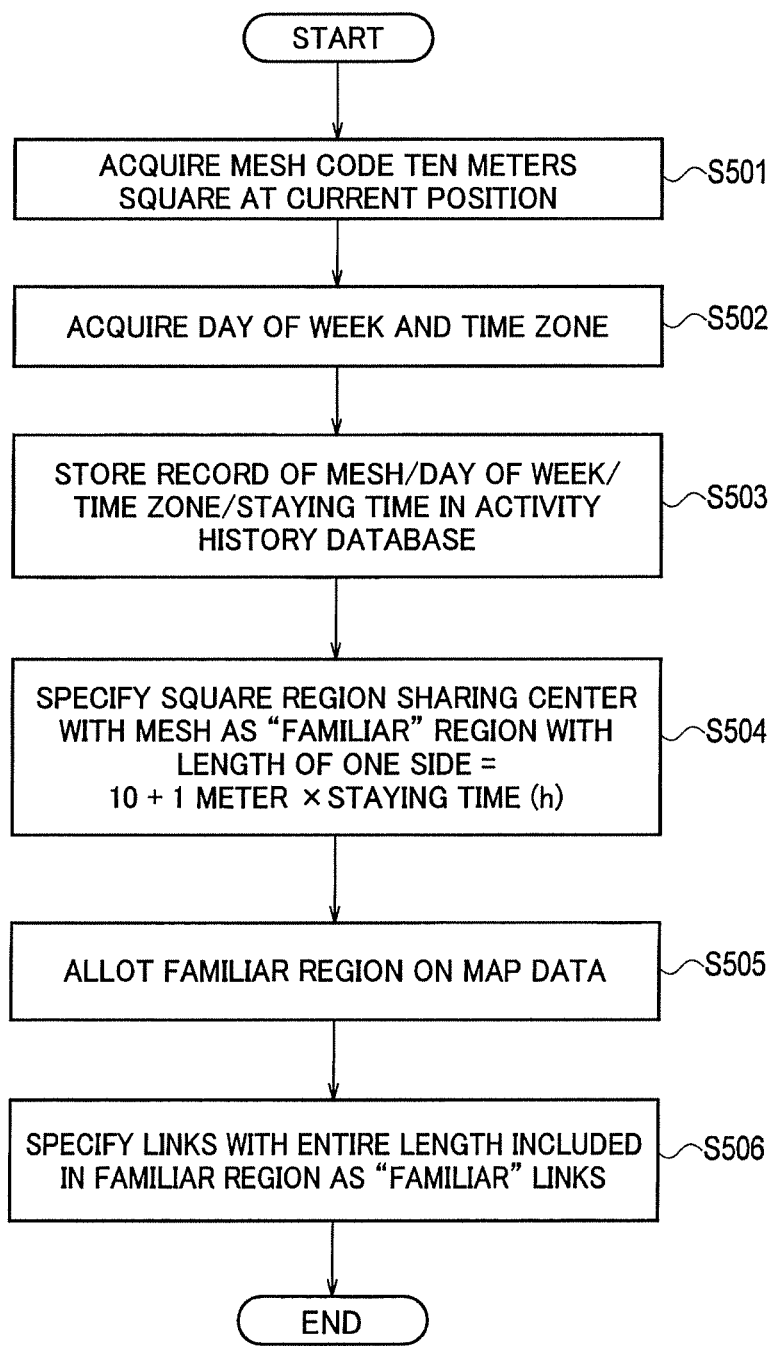

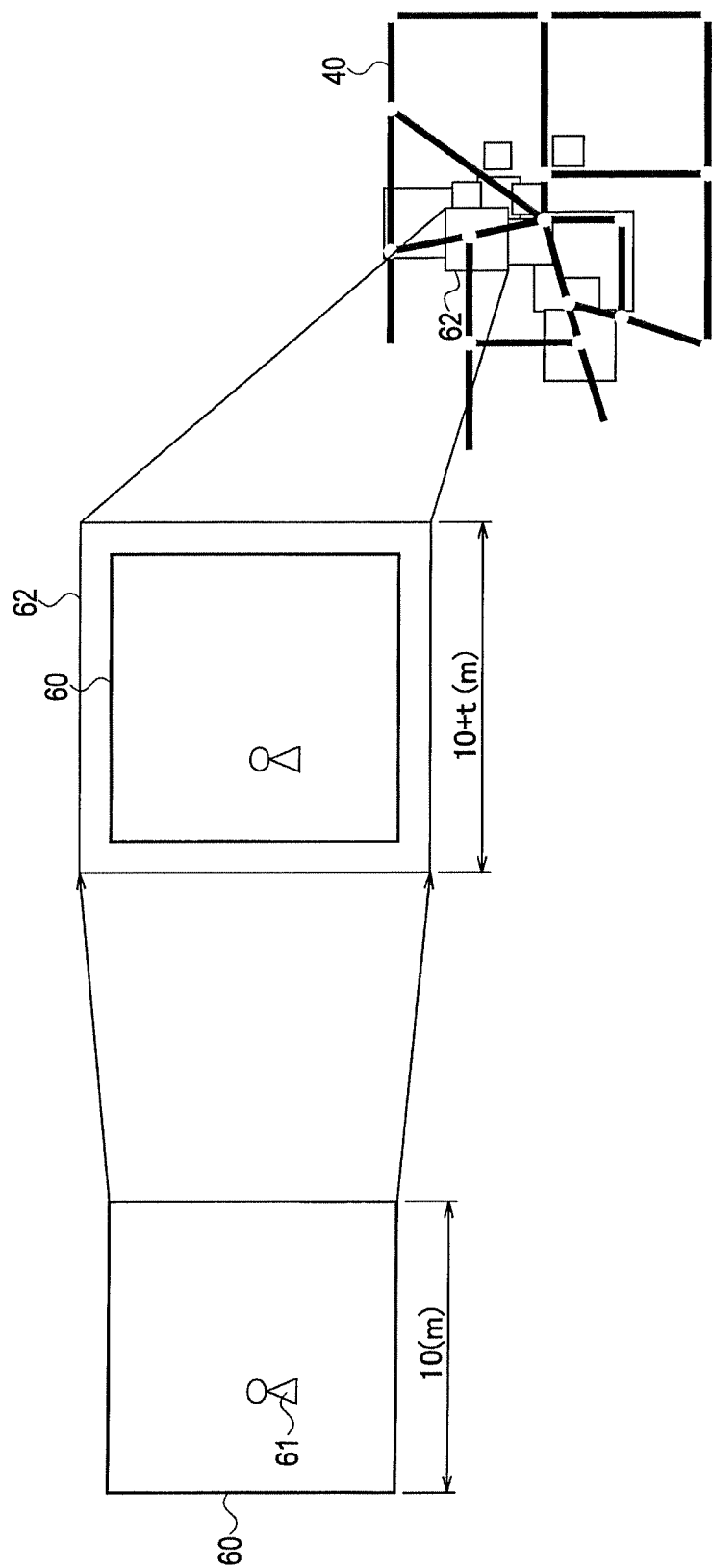

ROUTE SEARCHING METHOD AND ROUTE SEARCHING DEVICE

BACKGROUND

Technical Field

The present invention relates to a route searching method and a route searching device.

Related Art

A route searching method is known to reflect, along an entire route from a departure point to a destination, technical know-how for facilitating driving included in probe data acquired from a large number of vehicles (refer to Patent Document 1). The method disclosed in Patent Document 1 reflects technical know-how, common to a large number of drivers, for facilitating driving when continuously traveling on a plurality of particular links after traveling on other links, along the entire route from the departure point to the destination (refer to Patent Document 1).

CITATION LIST

Patent Literature

Patent Document 1: Japanese Patent Unexamined Publication No. 2009-002817
Patent Document 2: Japanese Patent Unexamined Publication No. 05-224601
Patent Document 3: Japanese Patent Unexamined Publication No. 2006-177804

SUMMARY OF INVENTION

The route searching method disclosed in Patent Document 1 searches out a route supported by a logic based on a majority vote with unspecified drivers to provide the route to each driver. However, roads easy to drive vary depending on drivers because of a difference or variation in interest or preference. The method thus does not always search out a route which can be easy to drive for each driver.

One or more embodiments of the present invention provides a route searching method and a route searching device capable of searching for a route which can be easy to drive for each driver.

A route searching method according to one or more embodiments of the present invention accumulates a history of activities of a driver in a database, when the history of activities is accumulated, sets a region based on a position on a map at which the history of activities is accumulated as a first region, increases an area of the first region as the history of activities increases, and searches for a secondary route for reaching a destination from the first region.

The route searching method and the route searching device according to one or more embodiments of the present invention can search out a route which can be easy to drive for each driver.

BRIEF DESCRIPTION OF DRAWINGS

FIG. 9 is a flow chart illustrating a series of steps regarding information processing (1. accumulation of history of activities and determination of familiar links) executed by an electronic circuit 11 according to a second embodiment.
FIG. 10A is a schematic diagram illustrating a familiar region 62 based on a mesh code 60 and the entire familiar regions 62 superposed on a road system.

DETAILED DESCRIPTION

Figure 1:
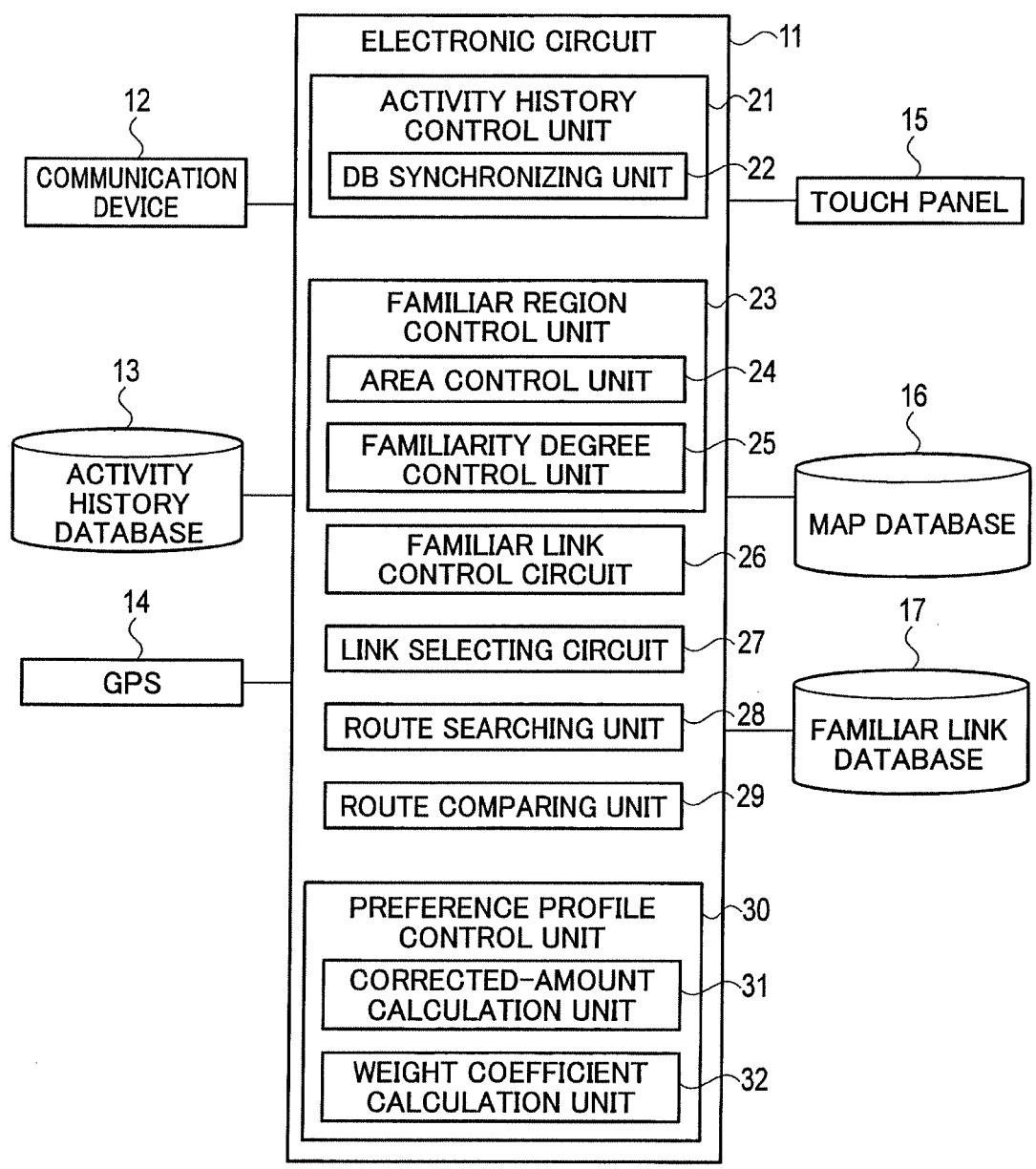
FIG. 1 is a block diagram showing a configuration of a route searching device according to a first embodiment.

Embodiments will be described below with reference to the drawings. The same elements in the descriptions of the drawings are denoted by the same reference numerals, and overlapping explanations are not repeated below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A configuration of a route searching device according to the first embodiment is described with reference to FIG. 1. The route searching device can be used for a navigation system mounted in a vehicle or a mobile device such as a smartphone (hereinafter referred to as a terminal) having a navigating function. The first embodiment is illustrated with a case of a navigation system.

The route searching device is a navigation system for searching for a route for reaching a predetermined destination by a vehicle and presenting the searched route to a driver. The route searching device includes an electronic circuit 11, a communication device 12, an activity history database 13, a global positioning system (GPS) 14, a touch panel 15, a map database 16, and a familiar link database 17.

The electronic circuit 11 executes a series of information processing steps for searching for a route, for example. The electronic circuit 11 may be a microcomputer including a central processing unit (CPU), a memory, and an input/output unit. A computer program for causing the microcomputer to serve as the electronic circuit 11 is installed to be executed in the microcomputer. Accordingly, the microcomputer functions as the electronic circuit 11. While the first embodiment is illustrated with the case in which the software is installed to fabricate the electronic circuit 11, it should be understood that dedicated hardware for executing each information processing as described below can be prepared to compose the electronic circuit 11. The respective circuits (21 to 32) included in the electronic circuit 11 may be composed of individual hardware. The electronic circuit 11 may also serve as an electronic control unit (ECU) used for other control processing in the vehicle. The respective circuits (21 to 32) will be described below.

The communication device 12 communicates with external facilities outside the vehicle via a wireless communication. For example, the communication device 12 receives information of Vehicle Information and Communication System (VICS: registered trademark) transmitted from an electric wave beacon, an optical beacon, or a radio beacon installed on a roadside. The communication device 12 causes the vehicle to have access to the Internet using mobile communication technology. The electronic circuit 11 synchronizes activity history data accumulated in the activity history database 13 between a plurality of terminals used by the same user (the driver) and the navigation system mounted in the vehicle. The synchronization of the activity history data will be described below.

The activity history database 13 accumulates a history of activities of the driver. The history of activities includes a driving history of the vehicle on which the driver rides, and a staying history of the driver at a destination or a point of transfer. The driving history includes a frequency of use and a degree of driving in an individual link composing a road system. The staying history of the driver includes a staying time, the number of times of stay, and a range of activities around facilities with a higher frequency of use at a destination or a point of transfer. The activity history database 13 can also accumulate a history of activities accumulated in a terminal that the driver (the user) out of the vehicle holds, in addition to the history of activities of the driver on the vehicle by the synchronization processing of the data by the electronic circuit 11, as described above.

The GPS 14 receives radio waves from a plurality of GPS satellites, and calculates a distance from the vehicle to the respective positions, so as to measure a current position of the vehicle. To measure the current position of the vehicle, any known means may be used instead of the GPS 14.

The touch panel 15 is a user interface (UI) between the driver and the route searching device. In particular, the touch panel 15 functions as an input device for receiving conditions for route searching, such as inputs of a departure point, a destination, and a point of transfer, and functions as a display device for presenting a result of the route searching to the driver. The UI is not limited to the touch panel 15. For example, a voice recognition device may be used instead of the touch panel 15. Alternatively, the result of the route searching may be projected directly on a front windshield of the vehicle.

The map database 16 accumulates map information about roads on which the vehicle can drive. The map information includes a road system on a digital road map. The road system is indicated by a combination of "nodes" and "links". A node represents an intersection or any other knot point on the road system, and a link represents a road interval between the respective nodes. An identification number (ID) is allotted to the respective nodes and links.

The familiar link database 17 accumulates "familiar" link information generated by the information processing executed by the electronic circuit 11. Specific explanations of "familiar" links will be made below.

A plurality of circuits (21 to 32) included in the electronic circuit 11 is described below. The electronic circuit 11 includes an activity history control unit 21, a familiar region control unit 23 (a first region control circuit), a familiar link control circuit 26, a link selecting circuit 27, a route searching unit 28, a route comparing unit 29, and a preference profile control unit 30. The first and second embodiments exemplify a case of including a circuit unit (21 to 29), and the third embodiment exemplifies a case of further including a preference profile control unit 30.

The activity history control unit 21 stores, in the activity history database 13, measurement data indicating the current position of the vehicle acquired by the GPS 14 in association with data on a driver's identifier, a date, a day of a week, and a time zone. The activity history control unit 21 includes a database (DB) synchronizing unit 22. The DB synchronizing unit 22 synchronizes the activity history data accumulated in the activity history database 13 between a plurality of terminals used by the same user (the driver) and the navigation system mounted in the vehicle, as described above.

The familiar region control unit 23 controls, according to the history of activities of each individual driver, an area of a familiar region (a first region) and a degree of familiarity on the map on the basis of a position on the map at which the history of activities is accumulated. The familiar region control unit 23 includes an area control unit 24 for controlling an area of a familiar region depending on the history of activities of the driver, and a familiarity degree control unit 25 for controlling a degree of familiarity per familiar region in accordance with the history of activities of the driver. When the history of activities of the driver is accumulated, the area control unit 24 increases the area of the familiar region on the map on the basis of the position on the map in which the history of activities of the driver is accumulated, as compared with a case in which no history of activities is accumulated. The specific explanations of the area control unit 24 will be described below with reference to FIG. 3. The specific explanations of the familiarity degree control unit 25 will be described below in the third embodiment.

The familiar link control unit 26 searches for links with the entire length included in the familiar region from the road map, and temporarily stores the searched links as familiar links in the familiar link database 17.

The link selecting unit 27 extracts familiar links conforming to the conditions for route searching (such as the day of the week and the time zone) from the familiar link database 17. The link selecting unit 27 specifies a link through which the vehicle cannot pass in accordance with information indicating availability or unavailability of traffic, such as road construction and suspension of traffic, included in the VICS information received by the communication device 12, and eliminates the link from the extracted familiar links.

The route searching unit 28 determines the remaining familiar links selected by the link selecting unit 27 as links capable of composing routes, and searches for a route conforming to the searching conditions (the departure point, the destination, and the point of transfer).

The route comparing unit 29 compares costs of time used between a secondary route in which no history of activities is accumulated, the secondary route being searched from the familiar region, and a first route (a regular route) in which the history of activities is accumulated, and determines a preference order between the secondary route and the first route (the regular route) in accordance with the comparative result. For example, when an estimated required time for the secondary route is less than 105% of an estimated required time of the first route, the route comparing unit 29 presents the secondary route to the driver prior to the regular route.

Next, an operating example of the route searching device shown in FIG. 1 is described below. A series of information processing steps for route searching executed by the electronic circuit 11 is described with reference to the flow chart. The information processing is mainly divided into "1. accumulation of history of activities and determination of familiar links", "2. route searching based on familiar links", "3. elimination of familiar links", and "4. preference profile control". The specific explanations of "1. accumulation of history of activities and determination of familiar links", "2. route searching based on familiar links", and "3. elimination of familiar links" are made in the first embodiment. The specific explanations of "4. preference profile control" are made in the third embodiment.

<1. Accumulation of History of Activities and Determination of Familiar Links>

Figure 2:
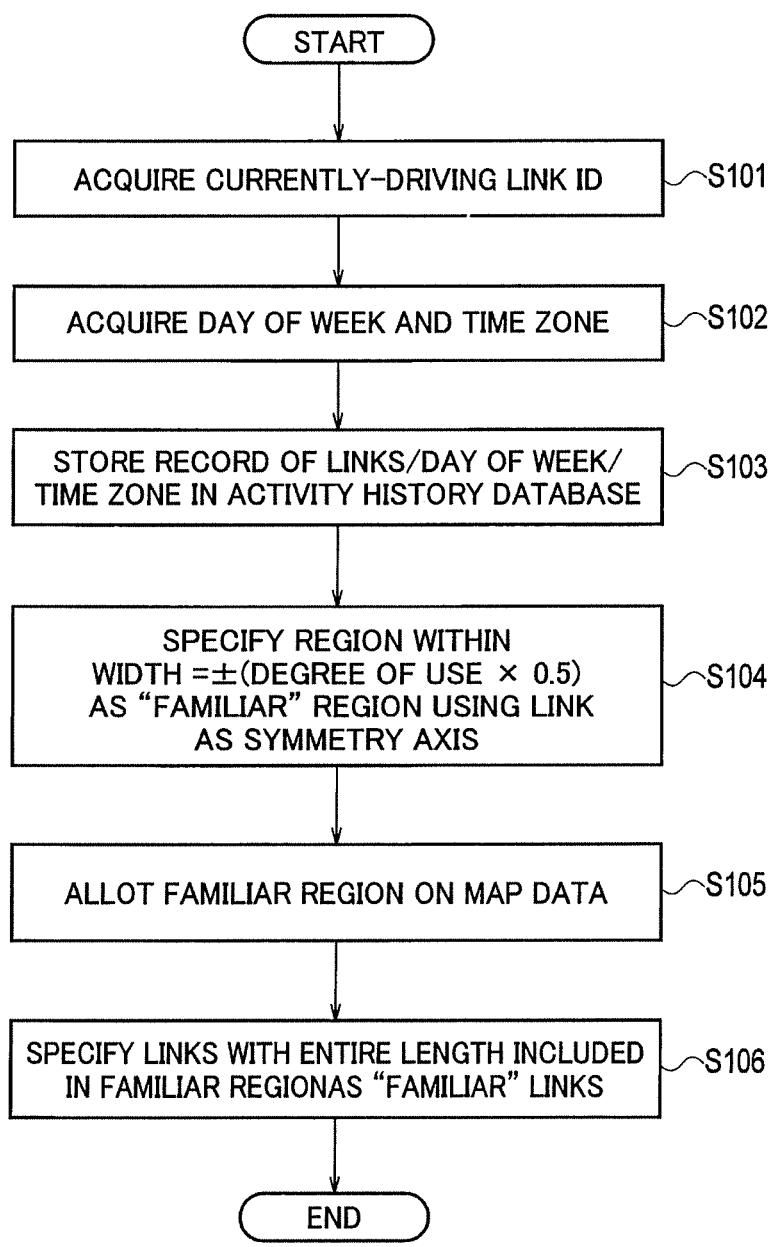
FIG. 2 is a flow chart illustrating a series of steps regarding information processing (1. accumulation of history of activities and determination of familiar links) executed by an electronic circuit 11.

The information processing "1. accumulation of history of activities and determination of familiar links" executed by the electronic circuit 11 is described below with reference to FIG. 2. The processing operation shown in FIG. 2 starts when an ignition switch (IGN) of the vehicle is turned on, and is repeated until the IGN is turned off.

In step S101, the activity history control unit 21 specifies links on which the vehicle is currently driving in accordance with the measurement data indicating the current position of the vehicle acquired by the GPS 14, so as to acquire an identifier of each link (a link ID) from the map database 16. The process proceeds to step S102, and the activity history control unit 21 acquires the data on the current day of the week and the current time zone.

The process proceeds to step S103, and the activity history control unit 21 associates the link IDs of the links on which the vehicle is currently driving with the data on the identifier of the driver driving the vehicle, the date, the day of the week, and the time zone, and stores the associated link IDs in the activity history database 13. Alternatively, the activity history control unit 21 may store, in the activity history database 13, a degree of driving of the link ID of each link on which the vehicle is driving per time condition including the day of the week and the time zone. The specifications of the time conditions are not limited to a day of a week and a time zone, and may be a monthly average or an annual average.

Figure 3:
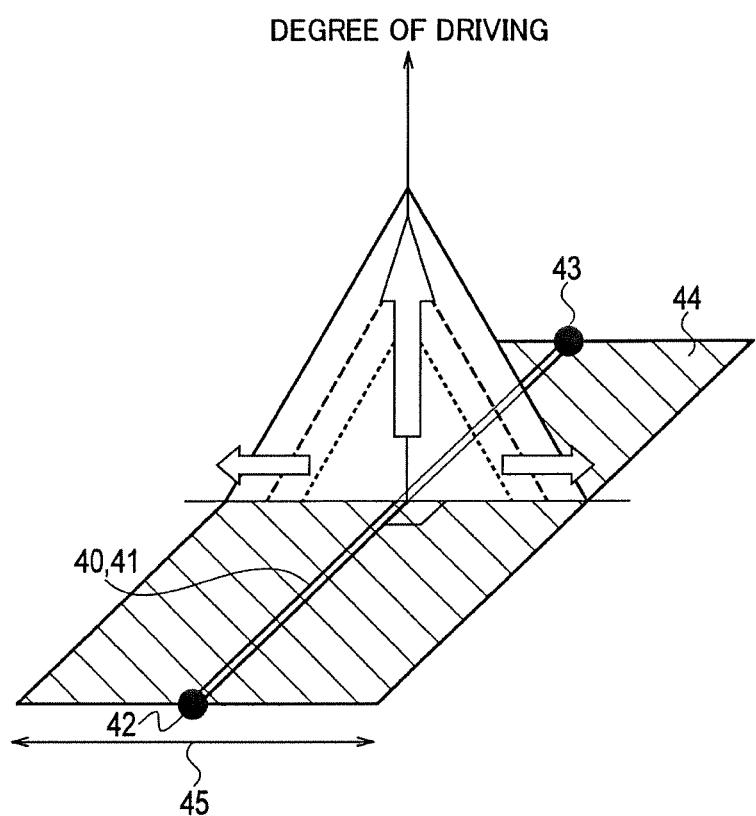
FIG. 3 is a schematic diagram showing a familiar region 44 having a positive correlation with a degree of driving per link 40.

The process proceeds to step S104, and the area control unit 24 controls the area of a familiar region according to the history of activities. For example, as shown in FIG. 3, the area control unit 24 uses a degree of driving for each link 40 conforming to the current time conditions as an argument, and defines a value obtained by multiplying the argument by a predetermined coefficient (for example, 0.5) as a width 45 of which a unit is a meter. The area control unit 24 specifies a closed region defined by the width 45 as a "familiar region 44" using each link 40 as a symmetry axis. The width 45 and the area of the familiar region 44 have a positive correlation with respect to the degree of driving. The width 45 and the area of the familiar region 44 monotonically increase as the degree of driving increases. Namely, the familiar region 44 is a region radially enlarged on the basis of the links 40.

The positive correlation of the familiar region with respect to the degree of driving is not limited to a linear function. The history of activities has been illustrated with the degree of driving, but is not limited thereto, and may be the number of times of use of the links 40, or a degree of driving or the number of times of use per unit time, which is a frequency of driving or a frequency of use.

The area control unit 24 increases the area of the familiar region 44 on the map on the basis of the position (the links 40) on the map in which the history of activities (including the degree of driving, the number of times of use, the frequency of driving, and the frequency of use) is accumulated, as compared with a case in which no history of activities is accumulated.

The process proceeds to step S105, and the familiar link control unit 26 superposes the entire familiar region 44 specified by the area control unit 24 on the map data stored in the map database 16. The process proceeds to step S106, and the familiar link control unit 26 searches for, from the map data, peripheral links of which the entire length is included in the familiar region 44 on the map, and stores all of the searched links in the link database 17 as familiar links.

For example, when the nodes 42 and 43 and the link 40 shown in FIG. 3 are positioned on the road map, other roads, namely, all of other links located inside the familiar region 44 are extracted as familiar links, and stores link IDs of the familiar links in the link database 17.

<2. Route Searching Based on Familiar Links>

Figure 4:
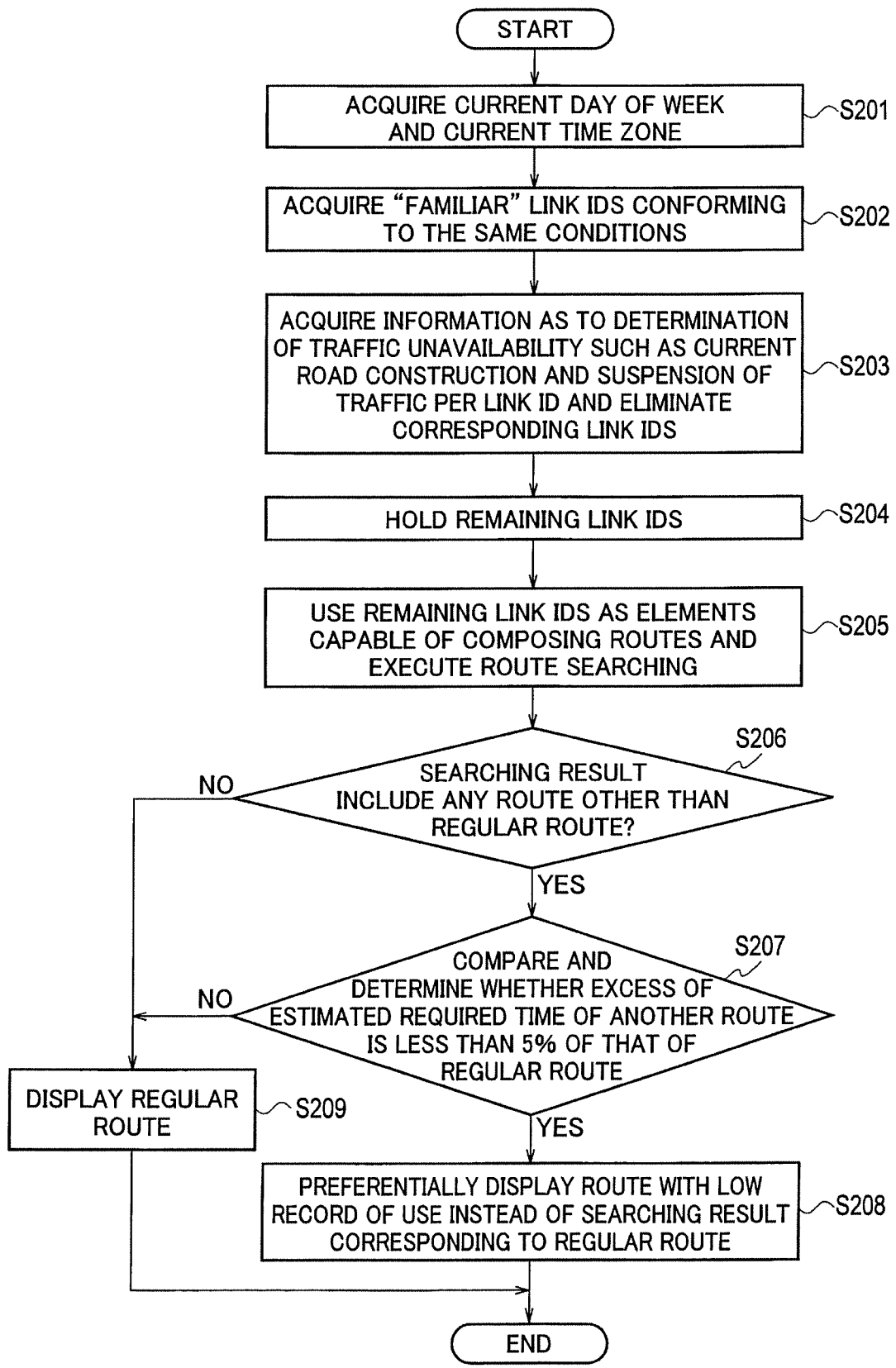
FIG. 4 is a flow chart illustrating a series of steps regarding information processing (2. route searching based on familiar links) executed by the electronic circuit 11.

The information processing "2. route searching based on familiar links" executed by the electronic circuit 11 is described below with reference to FIG. 4. The information processing shown in FIG. 4 starts when the user (the occupant of the vehicle) sets conditions for route searching (a destination) and instructs the execution of the route searching.

In step S201, the link selecting unit 27 acquires the current day of the week and the current time zone. The process proceeds to step S202, and the link selecting unit 27 acquires familiar link IDs conforming to the conditions for route searching (the day of the week and the time zone) from the familiar link database 17.

The process proceeds to step S203, and the link selecting unit 27 specifies a link ID of a link through which the vehicle cannot pass in accordance with information indicating availability or unavailability of traffic included in the VICS information, and eliminates the corresponding link ID from the familiar link IDs acquired in step S202.

Figure 6A:
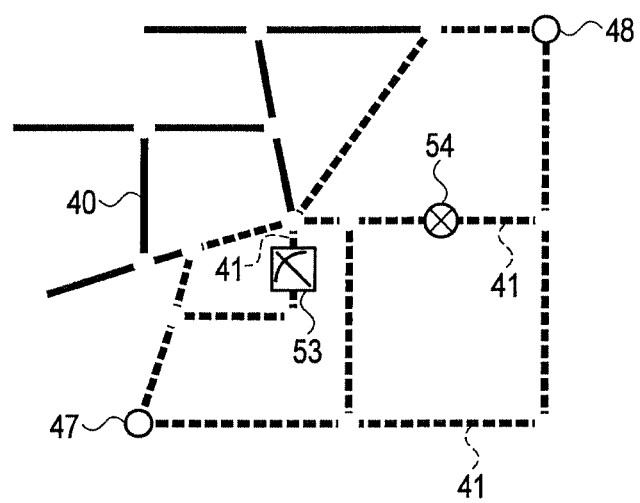
FIG. 6A is a schematic diagram illustrating a state in which a vehicle cannot pass through because of road construction 53 and suspension of traffic 54 in the road system including a plurality of links 40.
Figure 6B:
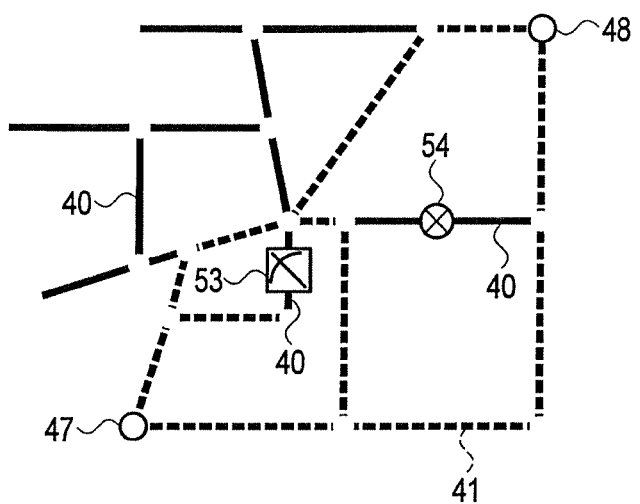
FIG. 6B is a schematic diagram illustrating a state in which the links though which the vehicle cannot pass are eliminated from the familiar links 41 shown in FIG. 6A.

As an example, FIG. 6A illustrates a situation in which a route from a departure point 47 to a destination 48 is searched in the road system including a plurality of links 40. Some of the links 40 include familiar links 41. There are some familiar links 41 through which the vehicle cannot pass because of road construction 53 and suspension of traffic 54. In this case, as illustrated in FIG. 6B, the unavailable links are eliminated from the familiar links 41. This elimination can avoid the trouble that the result of the route searching cannot be used for actual driving, for example. The process proceeds to step S204, and the link selecting unit 27 holds the link IDs of the remaining familiar links 41.

The process proceeds to step S205, and the route searching unit 28 determines the familiar links 41 held in the link selecting unit 27 to be links capable of composing routes, and searches for a route conforming to the searching conditions (the departure point and the destination). A route searching algorithm uses a searching means, such as a Dijkstra's algorithm, based on driving costs including the time and distance.

The process proceeds to step S206, and the route comparing unit 29 determines whether the searched route includes another route (a secondary route) other than the route (the regular route) in which the history of activities of the driver is accumulated most. When the secondary route is not included (NO in step S206), the process proceeds to step S209, and the route comparing unit 29 causes the regular route to be displayed on the touch panel 15. When the secondary route is included (YES in step S206), the preference order is required to be determined between the secondary route and the regular route.

The process then proceeds to step S207, and the route comparing unit 29 compares the costs of time used between the first route (the regular route) with the history of activities accumulated most, and the secondary route searched from the familiar region 44 with the small number of activities accumulated as a history, or no history of activities accumulated. For example, the route comparing unit 29 determines whether the estimated required time for the secondary route is less than 105% of the estimated required time of the first route. When the estimated required time for the secondary route is less than 105% (YES in step S207), a cost-competitive ability of the secondary route is determined to be sufficient. The process then proceeds to step S208, and the route comparing unit 29 causes the secondary route to be displayed first on the touch panel 15, instead of the regular route.

When the estimated required time for the secondary route is not less than 105% (NO in step S207), the cost-competitive ability of the secondary route is determined to be insufficient. The process then proceeds to step S209, and the route comparative unit 29 causes the regular route to be displayed on the touch panel 15 prior to the secondary route.

Figures 7A, 7B:
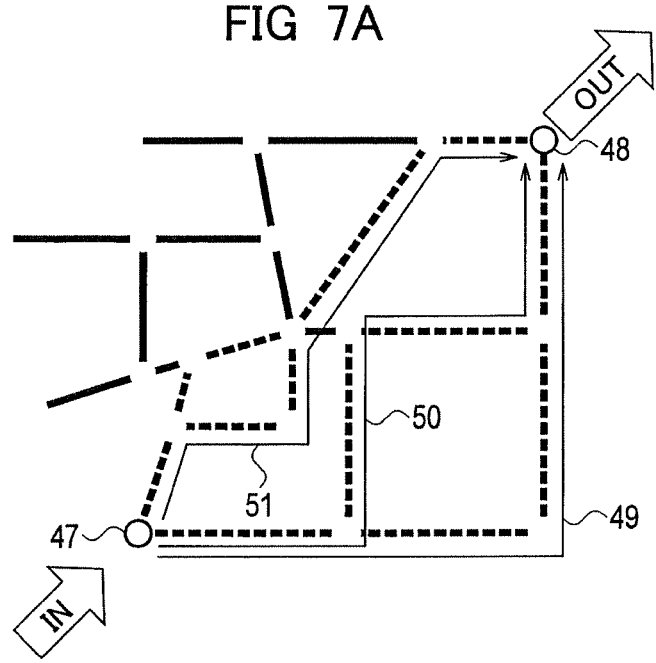
FIG. 7A is a schematic diagram illustrating a situation in which three routes (a regular route 49 and secondary routes 50 and 51) from the departure point 47 to the destination 48 are searched out.
FIG. 7B is a table showing required-time estimated values and the recommended order of the three routes (the regular route 49 and the secondary routes 50 and 51).

As an example, FIG. 7A illustrates a situation in which three routes (the regular route 49 and the secondary routes 50 and 51) from the departure point 47 to the destination 48 are searched out. The estimated value of the required time for the secondary route 51 (41 minutes) is less than 105% of the estimated value of the required time for the regular route (40 minutes) (YES in step S207). The secondary route 51 is thus set in a higher recommended order than the regular route 49, as shown in FIG. 7B. The estimated value of the required time for the secondary route 50 (45 minutes) is not less than 105% of the estimated value of the required time for the regular route (40 minutes) (NO in step S207). The secondary route 50 is thus set in a lower recommended order than the regular route 49, as shown in FIG. 7B. The three routes (49 to 51) are displayed on the touch panel 15 in the order indicated in FIG. 7B.

Figure 5A:
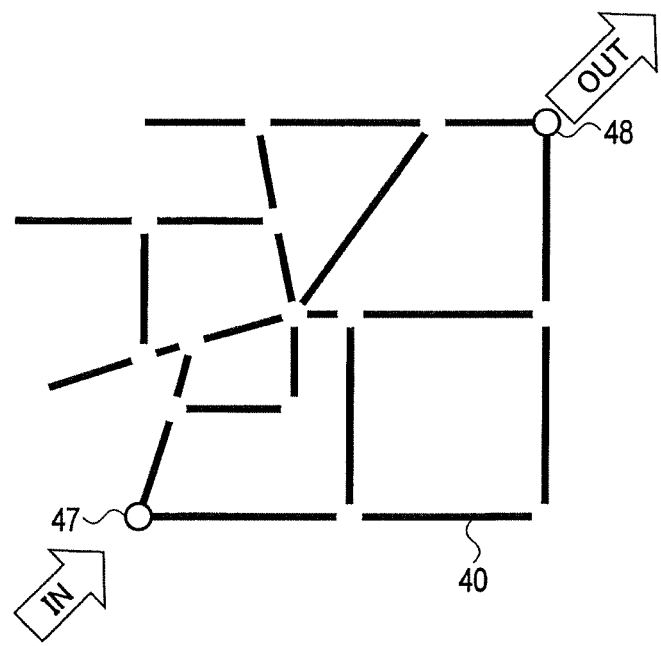
FIG. 5A is a schematic diagram illustrating a situation of searching for a route from a departure point 47 to a destination 48 in a road system including a plurality of links 40.

Next, a state in which the number or alternatives of routes searched by the route searching processing shown in FIG. 4 increase as the familiar region 44 is enlarged, is described with reference to FIG. 5A to FIG. 5G As shown in FIG. 3, the area of the familiar region 44 monotonically increases as the degree of driving of the link 40 increases. A situation of searching for a route from the departure point 47 to the destination 48 in the road system including a plurality of links 40, as illustrated in FIG. 5A, is described below.

Figure 5B:
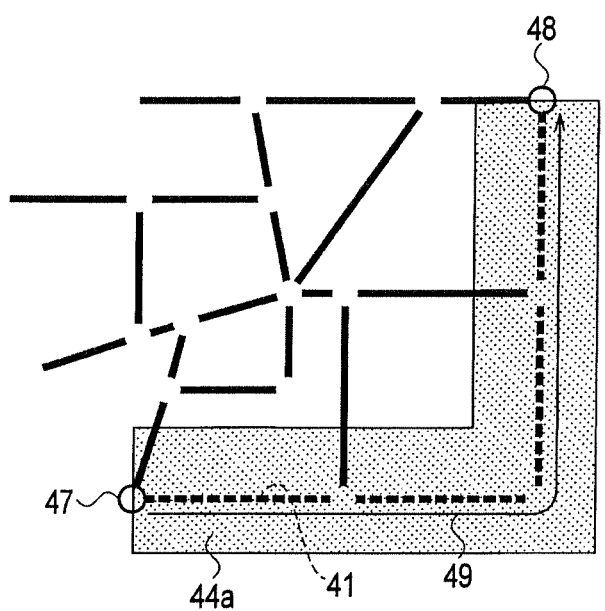
FIG. 5B is a schematic diagram illustrating a familiar region 44a in the situation shown in FIG. 5A.

As shown in FIG. 5B, the familiar link control unit 26 superposes the entire familiar region 44a specified by the area control unit 24 on the road system including a plurality of links 40. All of links of which the entire length is included in the familiar region 44a are specified as familiar links 41. The familiar region 44a illustrated in FIG. 5B does not include links 40 other than the links 41 composing the regular route 49.

Figure 5C:
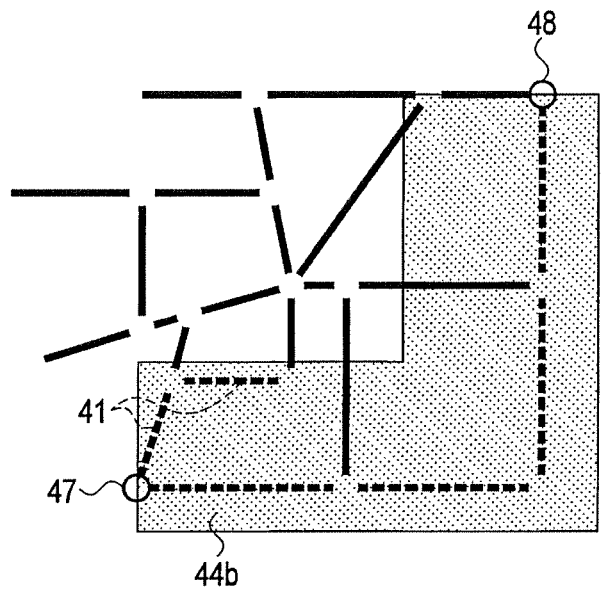
FIG. 5C is a schematic diagram illustrating a familiar region 44b enlarged from FIG. 5B and links 41 included in the familiar region 44b.

The increase in the history of activities on the regular route 49 (the links 41) used as criteria for determining the familiar region 44a from the state shown in FIG. 5B, leads to the familiar region 44b shown in FIG. 5C. Since the width 45 of the familiar region 44b (refer to FIG. 3) is wider than the width 45 of the familiar region 44a, the area of the familiar region 44b is larger than the area of the familiar region 44a. Namely, as the number of times of use of the regular route 49 increases, the area of the familiar region 44b based on the regular route 49 increases. The familiar region 44b shown in FIG. 5C thus additionally includes two links 41 in addition to the links 41 used as criteria for determining the familiar region 44b. Namely, two more familiar links 41 are added.

Figure 5D:
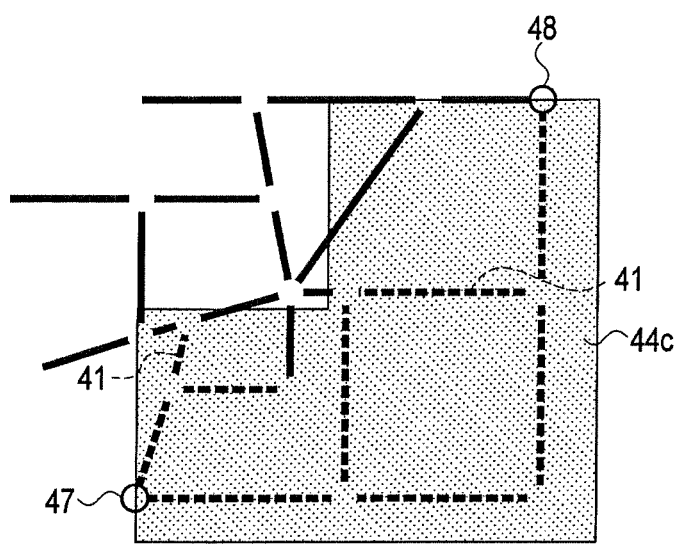
FIG. 5D is a schematic diagram illustrating a familiar region 44c enlarged from FIG. 5C and links 41 included in the familiar region 44c.
Figure 5E:
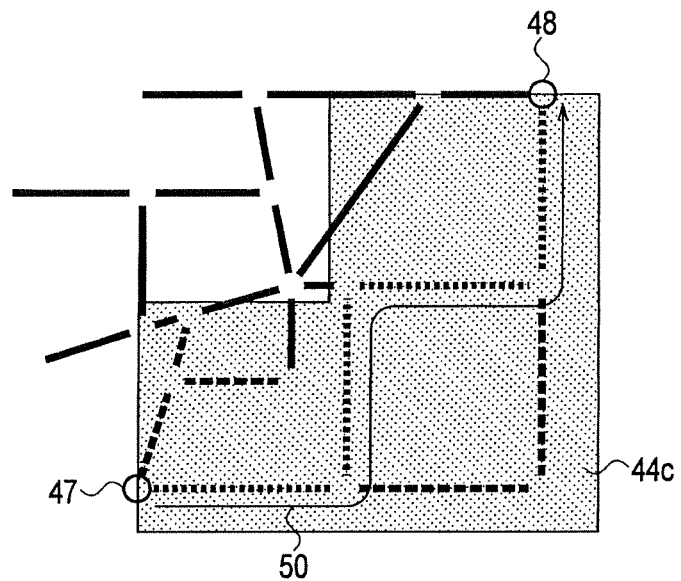
FIG. 5E is a schematic diagram illustrating a familiar region 44c enlarged from FIG. 5D and a secondary route 50 searched out in the familiar region 44c.

When the history of activities increases, namely, when the number of times of use of the regular route 49 increases, three more familiar links 41 are added, as shown in FIG. 5D. Then, another route (the secondary route) 50 different from the regular route (the first route) 49 is searched in step S205 using the familiar links 41 included in the familiar region 44c, as shown in FIG. 5E, so as to present the searched route to the driver.

Figure 5F:
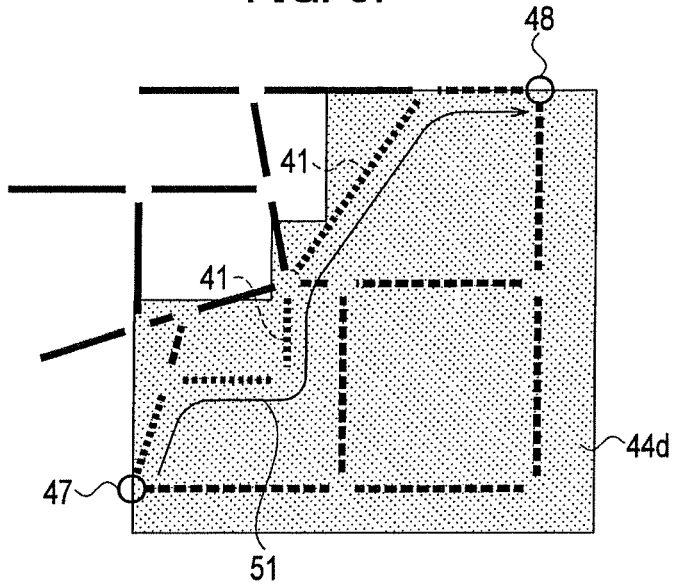
FIG. 5F is a schematic diagram illustrating the familiar region 44d enlarged from FIG. 5E, and links 41 and another secondary route 51 included in the familiar region 44d.
Figure 5G:
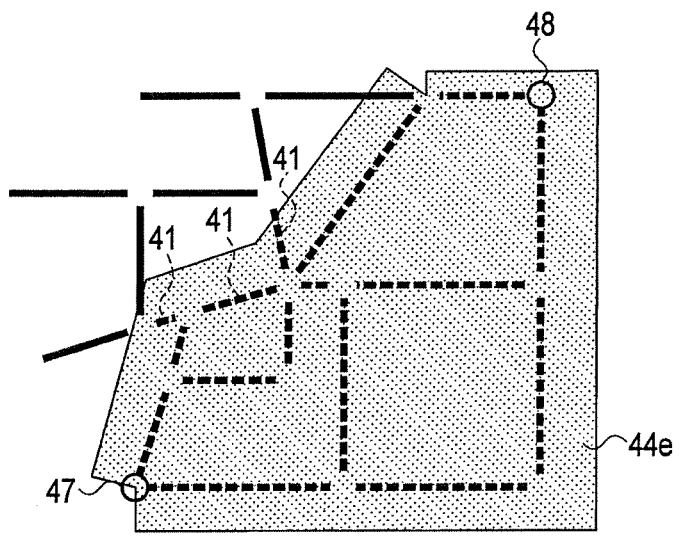
FIG. 5G is a schematic diagram illustrating a state in which the number or alternatives of routes searched by the route searching processing shown in FIG. 4 increase as the familiar region is enlarged.

As the history of use of the route 50 increases, the familiar region is updated on the basis of the familiar links 41 composing the route 50, and the area of the familiar region also increases. As shown in FIG. 5F, the other route (the secondary route) 51 is searched accordingly.

As described above, as the number of times of use of the roads (links 40) (the history of activities) increases, the driver's knowledge about the roads (the familiar links 41) inevitably increases, so that the driver gains insight into or acquaintance with the circumferential conditions of the roads (the familiar links 41). Accordingly, the driver can be presumed to know not only the corresponding roads but also the other peripheral roads (links 40). The insight into or acquaintance with the circumferential conditions as used herein is expressed by the "familiar region 44" as an index. The area of the familiar region 44 on the map is regulated depending on the history of activities of the driver. When the other routes (the secondary routes) 50 and 51 included in the familiar region 44 are searched as alternatives for reaching the predetermined destination 48, the secondary routes 50 and 51 are presumed to be easy for the driver to drive, so as to provide not only the first route 49 but also the searched secondary routes 50 and 51. Since the alternative routes 50 and 51 can be searched using the roads (the familiar links 41) that the corresponding driver is presumed to know, routes which are presumed to be easy to drive for each individual driver can be provided.

Further, roads easy to drive vary depending on drivers because of a difference or variation in interest or preference. Since various routes can be searched out in accordance with the history of activities of each individual driver, routes are differently searched for each vehicle, so as to relieve traffic congestion, improve the efficiency of use of the entire road system, and facilitate the flow of traffic accordingly.

<3. Elimination of Familiar Links>

Figure 8:
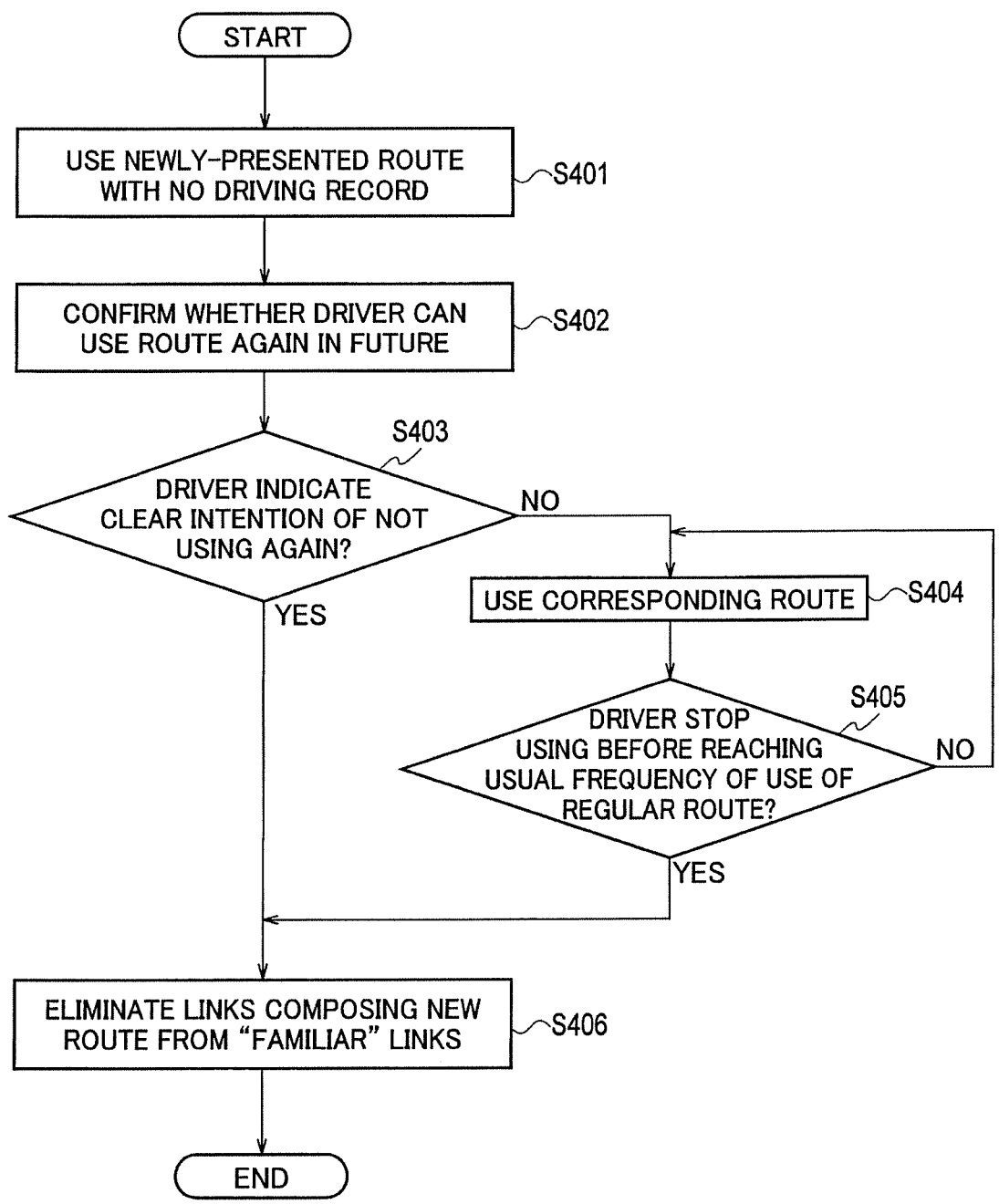
FIG. 8 is a flow chart illustrating a series of steps regarding information processing (3. elimination of familiar links) executed by the electronic circuit 11.

The information processing "3. elimination of familiar links" executed by the electronic circuit 11 is described below with reference to FIG. 8. The processing operation shown in FIG. 8 is executed when the driver drives a route for the first time searched first by the route searching shown in FIG. 4 with no history of activities of the driver (in step S401).

The process proceeds to step S402, and the familiar link control unit 26 requests the driver to determine whether to use the route used for the first time again in the future. In particular, when the use of the route set as a new recommended target is confirmed (in step S401), the familiar link control unit 26 inquires whether there is any probability that the driver will use the route in the future with reference to the preference of the driver (in step S402). For example, a screen for asking the determination is displayed on the touch panel 15. When the driver indicates a clear intention of not using the route again (YES in step S403), the process proceeds to step S406. The familiar link control unit 26 then eliminates the link IDs of the links composing the corresponding route from the familiar link database 17 so as not to use the links composing the corresponding route in the subsequent or later route searching.

When the driver does not indicate a clear intention of not using the route (NO in step S403), the familiar link control unit 26 also eliminates the link IDs of the links composing the route from the familiar link database 17 in step S406 so as not to use the links in the subsequent or later route searching in the same manner as described above, when the number of times of use of the corresponding route does not increase as compared with other routes when passing through the corresponding zone.

In particular, when the driver uses the route used for the first time in step S404 again, but stops using the route before the history of activities (the degree of driving and the number of times of use) on the corresponding route reaches the history of activities on the regular route 49 (YES in step S405), the familiar link control unit 26 eliminates the link IDs of the links composing the route used for the first time from the familiar link database 17 (in step S406).

According to the information processing (3. elimination of familiar links) shown in FIG. 8, an annoyance with repeated recommendation of routes and links not conforming to the preference of each individual driver can be eliminated when the route searching device is used continuously.

The first embodiment has been illustrated with the case of using the history of activities of the user (the driver) using the vehicle. The first embodiment may also use a moving history of the user walking, or using a bicycle, a motorcycle, or public transportation, through a terminal such as a smartphone having a navigating function.

The route searching device does not necessarily include the databases (13, 16, and 17). For example, the route searching device may use a cloud computing platform so as to implement the databases (13, 16, and 17) in a cloud (a data server) connected via the communication device 12.

As described above, the first embodiment can achieve the following effects.

The route searching device can selectively recommend another route (the secondary route), different from the regular route (the first route) shared by a large number of drivers, to a driver having deep insight into traffic circumstances in each zone. Since the selection of the other route (the secondary route) by the driver with the deep insight can be promoted, the volume of traffic on the regular route can be decreased, and the use of neighboring roads with less frequency of use can be increased after the recommendation, so as to improve the efficiency of use of the entire road system laid in the corresponding zone.

The route searching device selectively urges a driver having deep acquaintance with or insight into (a high level of familiarity with) a particular zone to use neighboring routes different from the route regularly used by a large amount of drivers. The route searching device causes, to use the regular route, a driver with a low level of familiarity with the neighboring routes, or a driver who is familiar with the neighboring routes but has a strong aversion to using the neighboring routes. Accordingly, the efficiency of the traffic capacity of the entire routes laid in the corresponding zone can be enhanced.

The level of familiarity with the corresponding zone is estimated in accordance with the history of activities (including the frequency of use and the frequency of stay) of each individual driver in the corresponding zone. As the level of familiarity is higher, the number of links (familiar links 41) which may compose routes is increased during the route searching. Accordingly, various routes can be recommended depending on the history of activities of each individual driver, so as to achieve the effect of dispersion of the routes used.

The history of activities includes the driving history, which includes the degree of use and the frequency of use of each link composing the road system. The familiar region 44 is a region radially enlarged using links, and the secondary routes 50 and 51 different from the regular route 49 (the first route) are searched out using links (familiar links) 41 included in the familiar region 44 and linked together. Accordingly, neighboring routes different from the regular route can selectively be presented to a driver having a history with a greater number of activities in the corresponding zone. The determination of the familiar region thus can be made using simple indexes such as a time, a frequency, or a distance.

The route comparing unit 29 compares the costs of time used between the secondary route 50 or 51 searched from the familiar region 44 and the regular route (the first route) 49 in which the history of activities is accumulated, and determines the preference order between the secondary routes and the first route in accordance with the comparative result. Accordingly, more alternatives (secondary routes) can be provided to a driver familiar with the corresponding zone. The popularization of use of the alternatives (the secondary routes) can further expand the familiar region 44, which increases the familiar links 41 accordingly.

The familiar link control unit 26 changes the standards for selecting links composing a route depending on the record of use of the secondary route 50 or 51, as illustrated in FIG. 8. In particular, the familiar link control unit 26 changes the standards for selecting links composing a route according to learning results derived from the record of use of the secondary route 50 or 51. Alternatively, the familiar link control unit 26 refers to the driver as to whether to use the route, and changes the standards for selecting the links composing the route depending on the learning results based on the response from the driver. When the route has low receptiveness for the driver as a result of the actual driving by the driver, the familiar link control unit 26 eliminates the links composing the route from the familiar links 41. Accordingly, an annoyance with repeated recommendation of routes and links not conforming to the preference of each individual driver can be eliminated when the route searching device is used continuously.

The familiar link control unit 26 increases the area of the familiar region 44 about the respective links with the positive correlation while referring to the history of activities. Accordingly, the familiar links 41 can continuously be referred to.

Second Embodiment

A second embodiment is illustrated with a case of searching for a route using a staying history of a user, who is a driver out of a vehicle. For example, the user moves by the vehicle from a departure point to a destination or a point of transfer, and the route searching device uses the history of the user out of the vehicle after arrival and staying at the destination or the point of transfer. The route searching device regulates the area of the familiar region 44 on the map and searches for a new route (a secondary route) inside the familiar region 44.

Namely, the history of activities of the driver includes not only the driving history but also the staying history. The staying history of the user includes a staying time, the number of times of stay, and a range of activities around facilities with a higher frequency of use at the destination or the point of transfer.

The route searching device according the second embodiment can be used for a terminal such as a smartphone having a navigating function. The specific configuration is substantially the same as that shown in FIG. 1, and overlapping explanations are not repeated below.

The information processing (1. accumulation of history of activities and determination of familiar links) executed by the electronic circuit 11 according to the second embodiment is described below with reference to FIG. 9. The processing operation shown in FIG. 9 starts when the user starts up a staying history accumulation program installed in the terminal, and is repeated until the program is finished. Alternatively, the processing operation may be performed in association with the navigation system of the vehicle. The route searching device may accumulate the driving history using the navigation system during driving, and accumulate the history of activities (including the moving history and the staying history) using the terminal when the user is out of the vehicle. For example, the processing operation may be started when the IGN is turned off and repeated until the IGN is turned on.

In step S501, the activity history control unit 21 acquires a mesh code to which the current point belongs in accordance with the measurement data on the current position of the vehicle acquired by the GPS 14. The mesh code may be a square mesh code ten meters square, for example. Alternatively, the latitude and longitude of the current point may be acquired, so as to determine a region ten meters square about the latitude and longitude as a center, instead of the mesh code. The process proceeds to step S502, and the activity history control unit 21 acquires data on the current day of the week and the current time zone.

The process proceeds to step S503, and the activity history control unit 21 stores, in the activity history database 13, the mesh code to which the current point of the terminal belongs in association with the data on the identifier of the driver driving the vehicle, the date, the day of the week, and the time zone, for example. Alternatively, the activity history control unit 21 may store, in the activity history database 13, the staying history (including the accumulated staying time or the accumulated number of times of stay) for each mesh code to which the current point belongs, per time condition including the day of the week and the time zone. The specifications of the time conditions are not limited to a day of a week and a time zone, and may be a monthly average or an annual average.

Figure 10B:
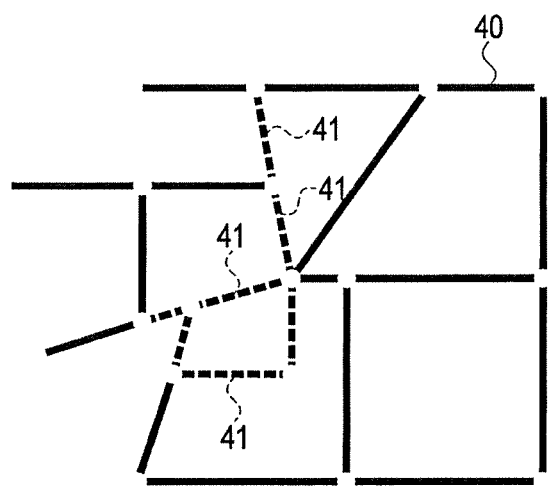
FIG. 10B is a schematic diagram illustrating familiar links 41 with the entire length included in the familiar region 62 on the map.

The process proceeds to step S504, and the area control unit 24 controls the area of a familiar region according to the staying history. For example, as shown in FIG. 10A, the area control unit 24 specifies, as a "familiar region 62", a closed region defined by the square 62 which shares the center with the mesh code 60. The length of one side of the familiar region (the square) 62, of which a unit is a meter, is obtained by using as an argument the accumulated staying time for each mesh code 60 conforming to the current time conditions, and multiplying the argument by a predetermined coefficient (for example, 1.0). The length of one side and the area of the familiar region 62 have a positive correlation with respect to the staying history (the accumulated value of the staying time or the number of times of stay). The area of the familiar region 62 monotonically increases as the accumulated value of the staying time or the number of times of stay increases. Namely, the familiar region 62 is a region radially enlarged on the basis of the destination or the point of transfer (the current point 61).

The positive correlation of the familiar region 62 with respect to the staying history is not limited to a linear function. The staying history has been illustrated with the accumulated value of the staying time or the number of times of stay, but is not limited thereto, and may be the staying time or the number of times of stay per unit time, which is a frequency of stay.

The area control unit 24 increases the area of the familiar region 62 on the map on the basis of the position (the mesh code 60) on the map in which the staying history (including the staying time, the number of times of stay, and the frequency of stay) is accumulated, as compared with a case in which no staying history is accumulated.

The process proceeds to step S505, and the familiar link control unit 26 superposes the entire familiar regions 62 specified by the area control unit 24 on the map data stored in the map database 16. In particular, the familiar link control unit 26 superposes the entire familiar regions 62 on the road system including a plurality of links 40. The process proceeds to step S506, and the familiar link control unit 26 searches for, from the map data, the links 40 of which the entire length is included in the familiar region 62 on the map. The familiar link control unit 26 stores all of the searched links in the link database 17 as familiar links 41.

The shape of the familiar region 62 is not limited to the square shape, and may be any of a rectangular shape or a circular shape (including a true circle and an oval shape). When the familiar region 62 has a circular shape having the center which is the central point of the mesh code 60 or the latitude and longitude of the current point, a radius or a diameter of the circle may be set to the same length as one side of the square 62 so as to control the shape of the familiar region 62 depending on the staying history.

The operations of "2. route searching based on familiar links" and "3. elimination of familiar links" in a series of information processing for route searching executed by the electronic circuit 11 according to the second embodiment, are the same as those in the first embodiment, and overlapping explanations are not repeated below.

The route searching method and the route searching device according to the second embodiment can be combined with the route searching method and the route searching device according to the first embodiment. In particular, the route searching device can search for a route using both of the driving history of the driver and the staying history of the driver out of the vehicle (the user of the terminal). In such a case, the DB synchronizing unit 22 synchronizes the activity history data accumulated in the activity history database 13 between a plurality of terminals used by the same user (the driver) and the navigation system mounted in the vehicle, as described above.

The second embodiment may take into account not only the staying history of the user but also the moving history, as the history of activities of the user. For example, when moving tracks around a plurality of points at which the staying time is biased are detected, the moving tracks may be used instead of each link 40 shown in FIG. 3 so as to specify the familiar region 44. The region enclosing the moving tracks thus can be specified as the familiar region 44. Accordingly, a hybrid history of activities combining the staying history and the moving history of the user can be accumulated.

As described above, the second embodiment can achieve the following effects.

The route searching device can estimate the acquaintance with or insight into (the level of familiarity with) a particular zone in accordance with the staying history and the moving history of the user holding a terminal. The route searching device selectively urges a driver having deep acquaintance with or insight into (a high level of familiarity with) a particular zone to use neighboring routes different from the route regularly used by a large amount of drivers. The route searching device causes, to use the regular route, a driver with a low level of familiarity with the neighboring routes, or a driver who is familiar with the neighboring routes but has a strong aversion to using the neighboring routes. Accordingly, the efficiency of the traffic capacity of the entire routes laid in the corresponding zone can be enhanced.

The level of familiarity with the corresponding zone is estimated in accordance with the staying history (including the staying time or the number of times of stay) of each individual driver in the corresponding zone. As the level of familiarity is higher, the number of links (familiar links 41) which may compose routes is increased during the route searching. Accordingly, various routes can be recommended depending on the history of activities of each individual driver, so as to achieve the effect of dispersion of the routes used.

The history of activities includes the staying history of the user, and the staying history includes the staying time, the number of times of stay, and the range of activities around facilities with a higher frequency of use at a destination or a point of transfer. The familiar region 62 is a region radially enlarged on the basis of the destination or the point of transfer, and the secondary routes 50 and 51 different from the regular route 49 (the first route) are searched out using links (familiar links) 41 included in the familiar region 62 and linked together. Accordingly, neighboring routes different from the regular route can selectively be presented to a driver having a history with a greater number of activities in a corresponding zone. The determination of the familiar region thus can be made using simple indexes such as a time, a frequency, or a distance.

The familiar link control unit 26 increases the area of the familiar region 62 about each point and each facility with the positive correlation while referring to the staying history. Accordingly, the familiar links 41 can continuously be referred to.

Third Embodiment

A route searching device of the third embodiment searches for a route while taking account of preference (a preference profile) varying depending on each individual driver. Actions for selecting a driving route taken by a driver include meaningful information to recognize the preference of the driver with a higher accuracy. In particular, the selection of a route from a plurality of routes recommended by the route searching device, or characteristics of a new route selected differently from the recommended routes, contribute to recognizing the preference of each individual driver.

The third embodiment exemplifies "preference profile control" for correcting a preference profile depending on a level of familiarity of a driver with respect to a zone in which a route change is made. The route change in an acquainted zone (the familiar region 44 or 62) during the preference profile control is presumed to be a definite decision made by the driver to satisfy the preference of the driver. The preference profile is then corrected depending on the circumstances of the route change, namely, the degree of the definiteness.

As used herein, the phrase "preference profile" refers to a rectangular radar chart plotting a degree of importance (preference) of each driver with respect to a plurality of (four) characteristics of a route, such as an average velocity, the number of right/left turns, the number of lanes, and the number of traffic lights. The degree of importance of each driver with respect to the respective characteristics can be used as coefficients ($a_1$, $a_2$, $a_3$, and $a_4$) in the formula (1) disclosed in Japanese Patent Unexamined Publication No. 05-224601, for example. In particular, the respective characteristics of a route (such as a driving distance l, a driving time t, a road width w, the number of lanes, and the number of right/left turns n) are multiplied by the degree of importance of each driver, so as to calculate a total estimation value of the route per driver. Accordingly, a route to be recommended to each individual driver can be determined in accordance with the total estimation value.

The electronic circuit 11 according to the third embodiment further includes a preference profile control unit 30, in addition to the circuit unit (21 to 29). The preference profile control unit 30 corrects a preference profile of a driver in accordance with characteristic values of a new route selected by the driver. The preference profile control unit 30 includes a corrected-amount calculation unit 31 for calculating a corrected amount for the preference profile, and a weight coefficient calculation unit 32 for calculating a weight coefficient by which the corrected amount is multiplied for each driver.

Figure 11:
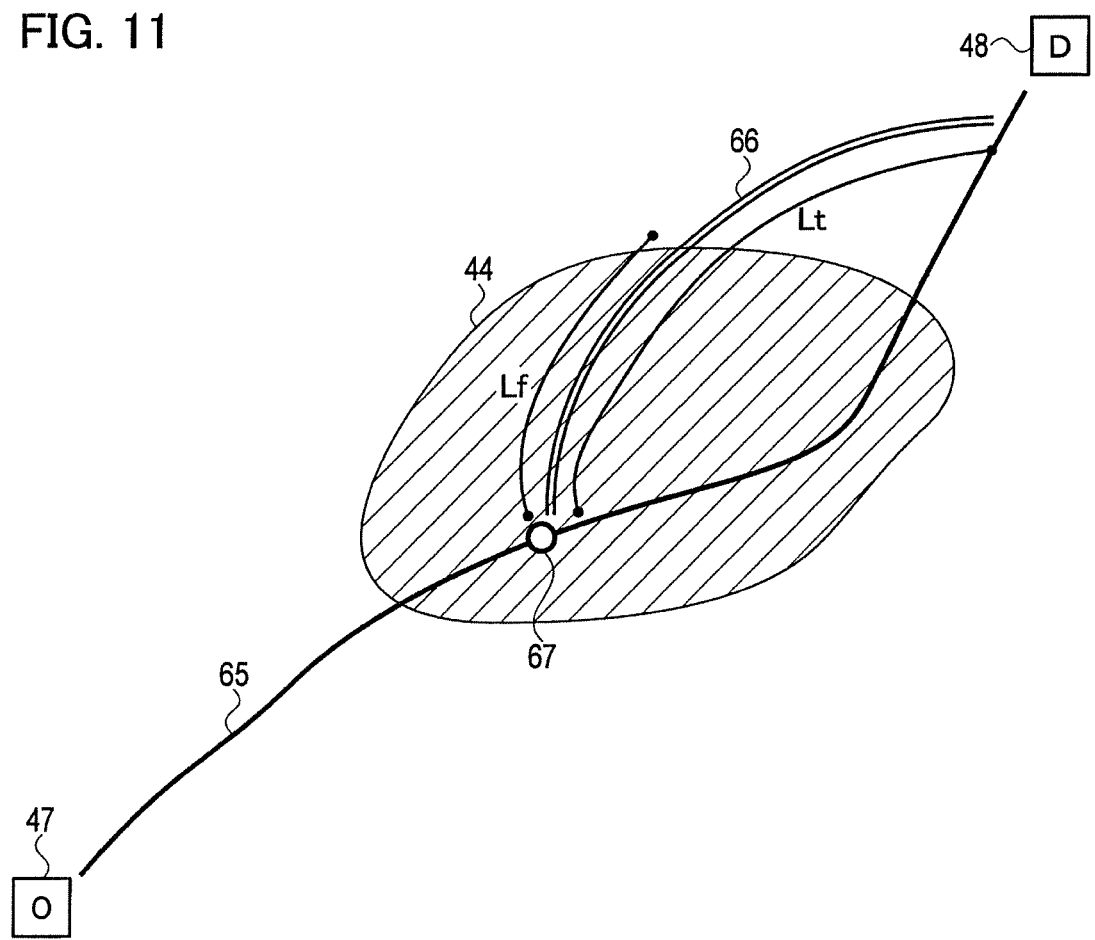
FIG. 11 is a schematic diagram illustrating a recommended route 65 recommended by a navigation system and an additionally selected route (a deviated route 66) deviated from the recommended route 65.

FIG. 11 illustrates a case in which the route searching device recommends a recommended route 65 from a departure point 47 to a destination 48. The driver starts driving on the recommended route 65, but deviates from the recommended route 65 at a point 67 on the way, and selects a new route (a deviated route 66) to continue driving. The driver then returns to the recommended route 65 in front of the destination 48 and reaches the destination 48.

The weight coefficient calculation unit 32 calculates, as a weight coefficient (w), a ratio of a driving distance (Lf) of the deviated route 66 within the familiar region 44 to a driving distance (Lt) of the entire deviated route 66, according to the formula (2). The ratio may be calculated using the driving times instead of the driving distances (Lt and Lf). For example, a ratio of the driving time on the deviated route 66 within the familiar region 44 to the driving time on the entire deviated route 66, may be calculated as a weight coefficient (w).

[Math. 1]

$$w = \frac{L_f}{L_t} \quad (2)$$

The preference profile control unit 30 multiplies the corrected amount for the preference profile by the weight coefficient (w). The preference profile control unit 30 then corrects the preference profile with the weighted corrected amount. In particular, the weighted corrected amount is added to or subtracted from the degree of importance (preference) of each driver with respect to the characteristics of the route (the average velocity, the number of right/left turns, the number of traffic lights, and the average number of lanes). The route searching unit 28 calculates the total estimation value of each searched route using the corrected preference profile. The route searching device determines the recommended order of the routes in which the preference of each driver is reflected, in accordance with the total estimation value. The correction of the preference profile will be described below with reference to FIG. 15.

As the deviated route 66 included in the familiar region 44 increases, the driver's intention of the route change can be presumed to be based more on the knowledge about or the acquaintance with the corresponding zone accumulated by the record of activities of the driver. Namely, as the ratio described above is higher, the route change can be presumed to reflect the preference of the driver and thus to be made more intentionally by the driver. Therefore, when the driver, who is driving while receiving the recommended route presented by the route searching device, deviates from the route (65) at a point (67) on the way, the degree of reflection of the preference of the driver on the decision is calculated as a weight coefficient (w) corresponding to the driving circumstances (the ratio) after the deviation. Namely, the degree of reflection is calculated as a weight coefficient (w) based on the ratio of the deviated route 66 within the familiar region 44 to the entire deviated route. The corrected amount for the former preference profile stored in the route searching device is thus weighted with the weight coefficient (w).

The third embodiment has been illustrated with the case in which the ratio is equal to the weight coefficient (w), but is not limited to this case. The weight coefficient (w) is only required to have a positive correlation with the ratio. For example, the weight coefficient (w) and the ratio may have a simple proportional relation.

The familiar region control unit 23 shown in FIG. 1 includes the familiarity degree control unit 25 for controlling a degree of familiarity for each familiar region 44 in accordance with the history of activities of the driver. The familiarity degree control unit 25 calculates the degree of familiarity at a higher value as the history of activities accumulated increases. The weight coefficient calculation unit 32 increases the weight used for the corrected amount for the preference profile as the degree of familiarity is higher.

Figure 12A:
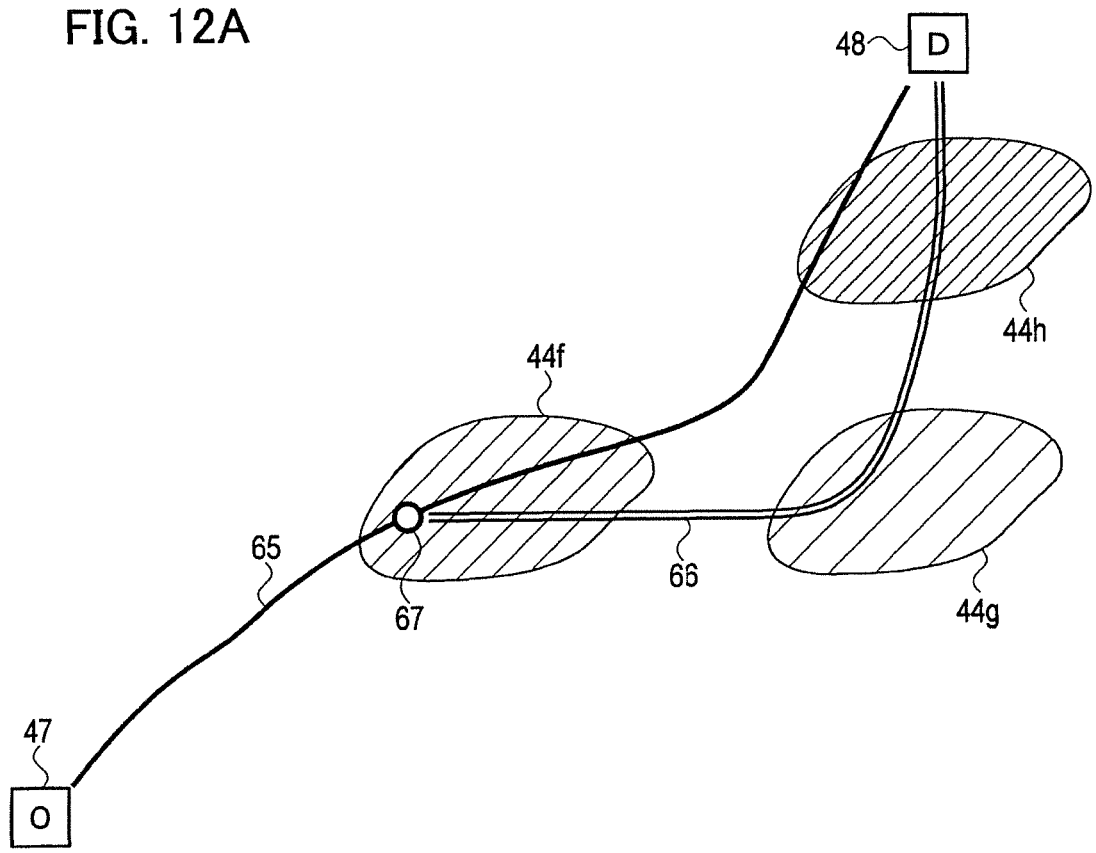
FIG. 12A is a schematic diagram illustrating a case of calculating a weight coefficient when a degree of familiarity is set in each of the familiar regions 44f to 44h.
Figure 12B:
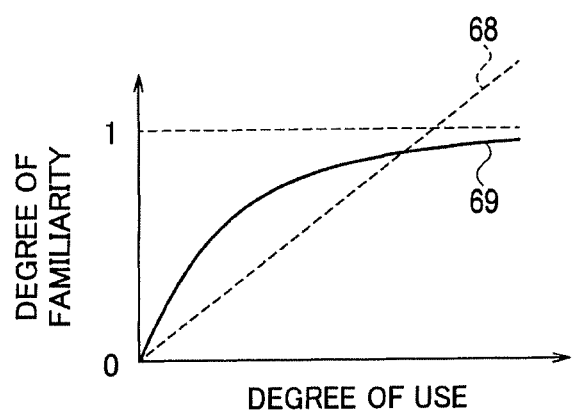
FIG. 12B is a graph showing a correlation between a degree of use and a degree of familiarity in a familiar region 44.

The degree of familiarity is defined by a monotonically increasing function having a positive correlation with the degree of use, the staying time, and the frequency of use in the familiar region. For example, as shown in FIG. 12B, an exponential curve 69 can be used in which, when the axis of abscissas represents the degree of use and the axis of ordinates represents the degree of familiarity, the intercept on the axis of ordinates is zero, and the infinite series of the degree of use converges to one. The degree of familiarity may be defined by a linear function 68.

The weight coefficient calculated according to the degree of familiarity reflects the degree of knowledge about or acquaintance with the familiar region through which the deviated route 66 passes, so as to recognize the certainty of the determination upon reflecting the preference of the driver.

Figure 13A:
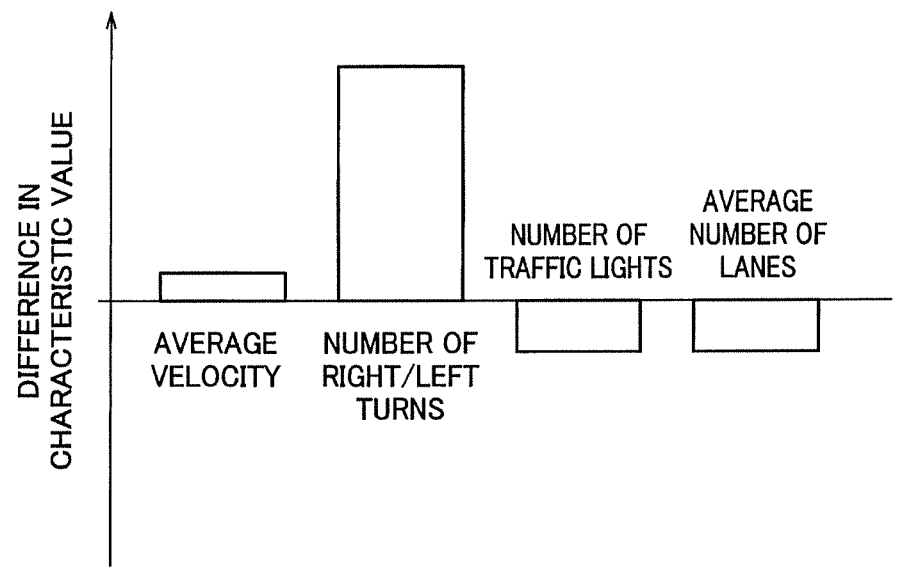
FIG. 13A is a graph illustrating a difference between the recommended route 65 and the deviated route 66 in each of the characteristic values (an average velocity, the number of right/left turns, the number of traffic lights, and an average number of lanes) of the respective routes.

FIG. 13A is a graph illustrating a difference between the recommended route 65 and the deviated route 66 in each of the characteristic values (the average velocity, the number of right/left turns, the number of traffic lights, and the average number of lanes) of the respective routes. The graph indicates each difference by a value obtained by subtracting the characteristic value of the recommended route 65 from the characteristic value of the deviated route 66. FIG. 13A illustrates a case in which the average velocity is faster, the number of right/left turns is larger, the number of traffic lights is smaller, and the average number of lanes is smaller in the deviated route 66 than in the recommended route 65. The driver having made this route change can be presumed to have the degree of importance (the preference) with respect to the respective characteristics, setting greater importance on the faster average velocity and the smaller number of traffic lights, while setting less importance on the larger number of right/left turns and the smaller average number of lanes which can complicate driving conditions. The corrected-amount calculation unit 31 calculates the corrected amount for the preference profile according to the difference in the respective characteristics shown in FIG. 13A. The calculation method is not limited to a particular method, and may be any conventional method.

Figure 13B:
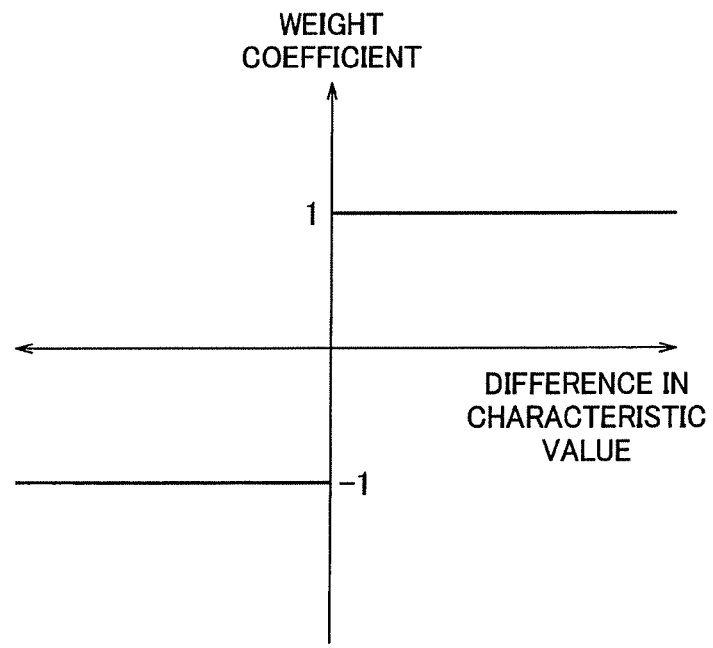
FIG. 13B is a graph illustrating a correlation of a weight coefficient with a difference in a characteristic value, not taking account of an absolute value of the difference in the characteristic value, but only taking account of a positive or negative sign of the difference in the characteristic value.
Figure 13C:
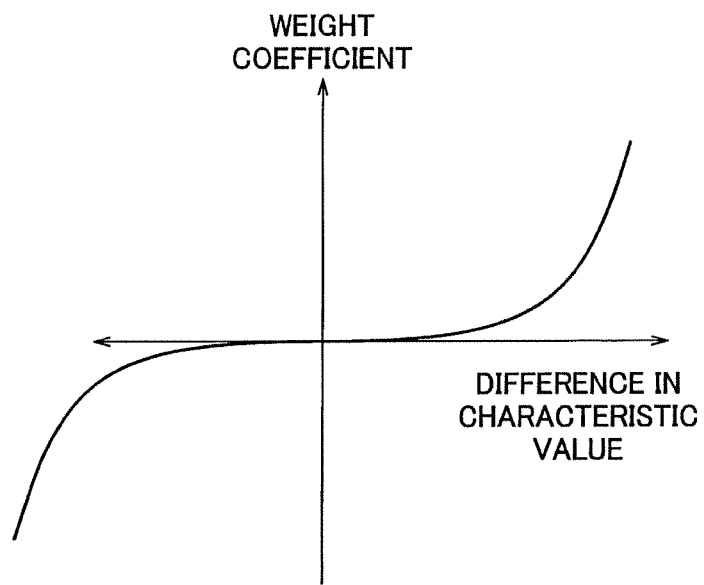
FIG. 13C is a graph illustrating a correlation of a weight coefficient with a difference in a characteristic value, defined by a quadratic function curve (a nonlinear graph).
Figure 13D:
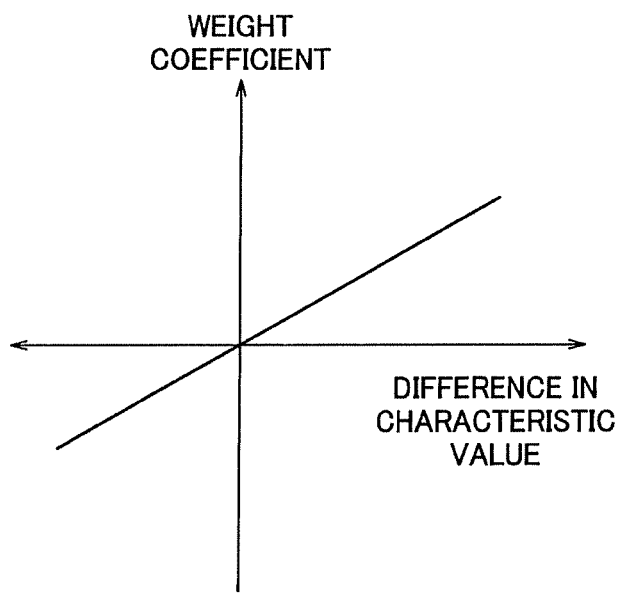
FIG. 13D is a graph illustrating a correlation of a weight coefficient with a difference in a characteristic value, defined by a linear function curve (a linear graph).

FIG. 13B to FIG. 13D each show an example of a correlation of the weight coefficient with the difference in the characteristic value. FIG. 13B illustrates a case of not taking account of an absolute value of the difference in the characteristic value but only taking account of a positive or negative sign of the difference in the characteristic value. When the difference in the characteristic value is a positive value, the driver is determined to set importance on the corresponding characteristic. The weight coefficient for the corrected amount is then set uniformly to 1.0. When the difference in the characteristic value is a negative value, the driver is determined to think little of the corresponding characteristic. The weight coefficient for the corrected amount is then set uniformly to −1.0.

FIG. 13C and FIG. 13D each illustrate a case in which the absolute value of the weight coefficient increases as the absolute value of the difference in the characteristic value increases, in accordance with the positive and negative signs of the difference. FIG. 13C is illustrated with a quadratic function curve (a nonlinear graph), and FIG. 13D is illustrated with a linear function curve (a linear graph). The weight coefficient with respect to the difference in the characteristic value thus can be defined by a monotonically increasing function. The difference in the characteristic value and the weight coefficient may have either a linear relationship or a nonlinear relationship. The corrected amount for the degree of importance (the preference) thus can be set depending on the difference in the respective characteristics accompanying the route change. Accordingly, the correction to the preference profile intrinsic to each driver can be made immediately.

The preference profile control unit 30 presents, to the driver, several weighting methods (tuning methods) for the corrected amount for the preference profile, as illustrated in FIG. 13B to FIG. 13D. The preference profile control unit 30 then executes weighting for the corrected amount for the preference profile in accordance with the weighting method chosen by the driver.

Figure 14:
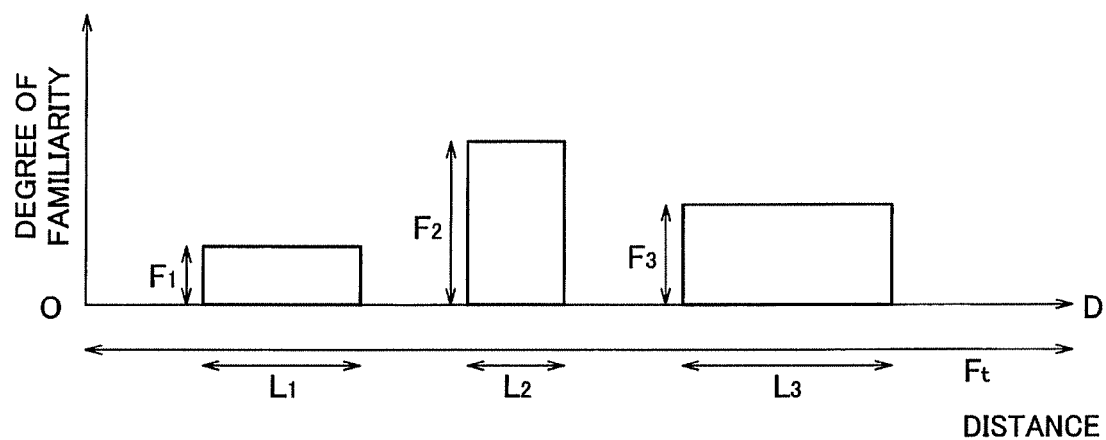
FIG. 14 is a graph illustrating a combination of methods of calculating a weight coefficient shown in FIG. 11, FIG. 12A, and FIG. 13A to FIG. 13D.

FIG. 14 illustrates a case of combining the three methods of calculating the weight coefficient shown in FIG. 11, FIG. 12A, and FIG. 13A to FIG. 13D. Degrees of familiarity ($F_1$, $F_2$, and $F_3$) shown in FIG. 14 are set in the three familiar regions ($44f$ to $44h$) shown in FIG. 12A. Lengths of the deviated route 66 in the familiar regions ($44f$ to $44h$) are defined as $L_1$, $L_2$, and $L_3$. A ratio of the lengths ($L_1$, $L_2$, and $L_3$) of the deviated route 66 within the familiar regions ($44f$ to $44h$) to the entire length ($L_t$) of the deviated route 66 is calculated according to the formula (2). The ratio is multiplied by each degree of familiarity ($F_1$, $F_2$, and $F_3$) so as to obtain a sum of the three weight coefficients. The sum is then multiplied by the weight coefficient (w9) described with reference to FIG. 13A to FIG. 13D so as to calculate the final weight coefficient ($W_1$). The calculation method described above is represented by the formula (3). While the above case has been illustrated with the combination of the three calculating methods, part of the three calculating methods may be combined as appropriate.

[Math. 2]

$$w_t = w9 \times \sum_{i}^{3} \frac{Fi \times Li}{Lt} \quad (3)$$

Figure 15:
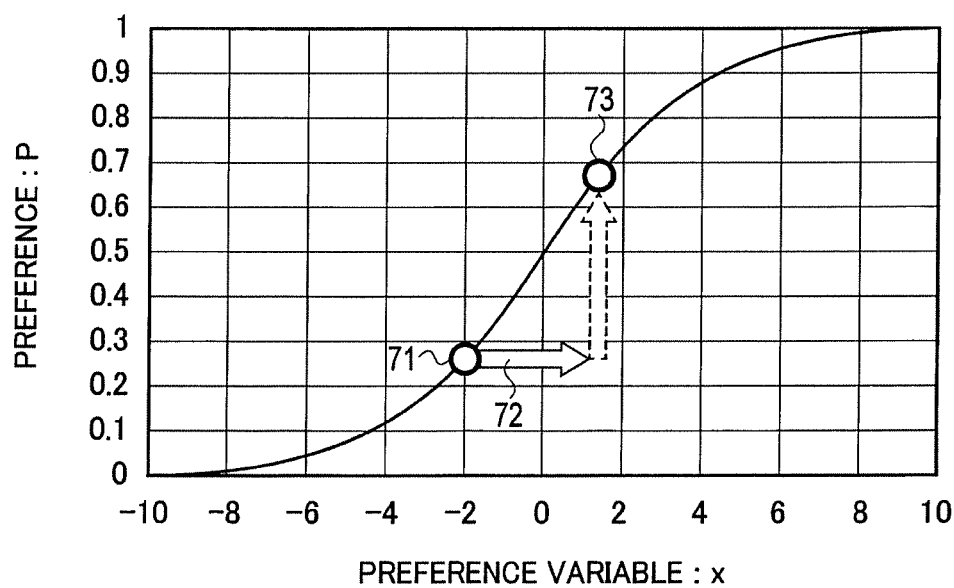
FIG. 15 is a graph illustrating a method of correcting a preference profile with a corrected amount after weighting.

An example of the method of correcting the preference profile with the weighted corrected amount is described with reference to the graph shown in FIG. 15. The axis of ordinates in FIG. 15 represents a degree of importance (preference: P) of a driver with respect to the respective characteristics of a route, and the axis of abscissas represents a preference variable (x). The preference (P) corresponds to the respective coefficients ($a_1$, $a_2$, $a_3$, and $a_4$) in the formula (1) disclosed in Japanese Patent Unexamined Publication No. 05-224601. The preference variable and the preference have a one-to-one relationship. As the preference variable increases, the preference increases.

The corrected amount 72 after weighting is added to or subtracted from the preference variable 71 before correction. The preference profile control unit 30 corrects the preference of each driver in each of the characteristics (the average velocity, the number of right/left turns, the number of lanes, and the number of traffic lights) composing the preference profile. The route searching device determines a route to be recommended to each driver using the preference (the degree of importance) after the correction.

FIG. 15 illustrates a sigmoid curve as an example of a monotonically increasing function. The initial values of the preference and the preference variable are set to 0.5 and zero. The preference converges to one or zero by repeating the correction to the preference. The variation in the preference then decreases with respect to the corrected amount for the preference variable. Due to the preference variable as a parameter, the past history is stored as an accumulated value, so as to promote the learning of the preference recognition by choosing an appropriate function.

As described above, the preference profile control unit 30 combines as appropriate the three calculating methods for the weigh coefficient shown in FIG. 11, FIG. 12A, and FIG. 13A to FIG. 13D so as to execute the weighting for the corrected amount of the preference profile. The preference profile control unit 30 then corrects the preference profile with the weighted corrected amount by the method illustrated in FIG. 15.

As described above, the third embodiment can achieve the following effects.

When the driver deviates from the recommended route 65 and drives on the deviated route 66 within the familiar region 44, the driver is presumed to preliminarily know the deviated route 66. The higher ratio of the deviated route 66 included in the familiar region 44 can be presumed to indicate the interest or preference of the driver more clearly. The preference profile control unit 30 increases the weight used for the corrected amount of the preference profile, as the ratio of the deviated route 66 included in the familiar region 44 to the entire deviated route is higher. Since the preference profile can be recognized accurately, a route with high receptiveness for a driver can be presented during route recommendation reflecting the preference.

The familiarity degree control unit 25 calculates the degree of familiarity for each familiar region in accordance with the history of activities of the driver. The preference profile control unit 30 increases the weight used for the corrected amount of the preference profile as the degree of familiarity is higher. The weighting can be made more accurately as the degree of familiarity is taken into account more deeply.

The preference profile control unit 30 provides, to the driver, a plurality of weighting methods for the corrected amount of the preference profile, and executes the weighting for the corrected amount in accordance with the weighting method chosen by the driver. Since the correcting method chosen in accordance with the driver's preference can be used, usability for the user can be improved.

While the present invention has been described above by reference to embodiments, it should be understood that the present invention is not intended to be limited to the descriptions and the drawings composing part of this disclosure. Various alternative embodiments, examples, and technical applications will be apparent to those skilled in the art according to this disclosure.

The functions described in the respective embodiments may be implemented in one or more processing circuits. A processing circuit includes a programmed processing device such as a processing device including an electric circuit. Such a processing device includes an application-specific integrated circuit (ASIC) configured to execute the functions described in the embodiments or conventional circuit components.

One or more embodiments of the present invention can also be used for a route searching device for accumulating a history of activities of a single driver in the activity history database 13. Such a route searching device can also search for a route which can be easy to drive for the corresponding driver in accordance with the history of activities of the driver. The activity history database 13 is thus only required to accumulate per driver the history of activities of one or more drivers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

13 ACTIVITY HISTORY DATABASE
21 ACTIVITY HISTORY CONTROL UNIT
23 FAMILIAR REGION CONTROL UNIT (FIRST REGION CONTROL CIRCUIT)
24 AREA CONTROL UNIT
25 FAMILIARITY DEGREE CONTROL UNIT
26 FAMILIAR LINK CONTROL UNIT
28 ROUTE SEARCHING UNIT (ROUTE SEARCHING CIRCUIT)
40 LINK
41 FAMILIAR LINK
44, 46 FAMILIAR REGION (FIRST REGION)
49 FIRST ROUTE (REGULAR ROUTE)
50, 51 SECONDARY ROUTE
65 RECOMMENDED ROUTE
66 DEVIATED ROUTE
$F_1, F_2, F_3$ DEGREE OF FAMILIARITY

The invention claimed is:

1. A route searching device comprising:
a setting unit configured to set a departure point and a destination of a vehicle;
an activity history acquisition unit configured to acquire a history of activities of a user of the vehicle;
a route searching unit configured to search for a driving route of the vehicle based on the departure point, the destination, and the history of activities; and
a route output unit configured to output the searched driving route,
wherein the route searching unit sets a predetermined region on a map in which the history of activities is accumulated as a first region and sets, as a second region, a region including the first region and further enlarged on a periphery of the first region based on the history of activities in the first region, so as to search for the driving route at least a part of which is in the second region excluding the first region.

2. The route searching device according to claim 1, wherein the history of activities is acquired from a mobile terminal belonging to the user and a navigation system mounted in the vehicle.

3. The route searching device according to claim 1, wherein the history of activities includes a driving history of the vehicle, and a staying history and a moving history of the user.

4. The route searching device according to claim 3,
wherein the driving history includes a frequency of use of an individual link composing a road system, and
wherein the staying history includes a staying time and a range of activities around a facility with a higher frequency of use at the destination or a point of transfer.

5. The route searching device according to claim 1, wherein the route output unit outputs an estimated value of a required time for each of the first route and the secondary route, and a recommended order determined between the first route and the secondary route.

6. The route searching device according to claim 1, wherein the second region is determined by reference to the history of activities conforming to a current time.

7. The route searching device according to claim 1, wherein the second region is set such that an area of the second region increases as a degree or frequency of the history of activities increases.

8. A driving route searching method using a route searching device for searching for a driving route of a vehicle, the method comprising:
setting a departure point and a destination of the vehicle;
acquiring a history of activities of a user of the vehicle;
when searching for the driving route based on the departure point, the destination, and the history of activities, setting a predetermined region on a map in which the history of activities is accumulated as a first region, and setting, as a second region, a region including the first region and further enlarged on a periphery of the first region based on the history of activities in the first region, so as to search for the driving route at least a part of which is in the second region excluding the first region.

9. The route searching device according to claim 1, wherein an electronic circuit comprises the route searching unit and the route output unit.

10. The route searching device according to claim 1, wherein the setting unit comprises a touch panel.

11. The route searching device according to claim 1, wherein the activity history acquisition unit comprises a mobile terminal belonging to the user.

12. The route searching device according to claim 1, wherein the activity history acquisition unit comprises a navigation system mounted in the vehicle.

13. The route searching device according to claim 1, wherein the route searching unit searches for a first route passing through the first region and a secondary route which is not in the first region but in the second region, and the searched driving route includes the first and the secondary routes.

\* \* \* \* \*